Jan. 3, 1961 H. SCHWAB 2,967,061
LOADING SYSTEM FOR TRAILERS AND LIKE VEHICLES ON PLATFORMS
Filed Oct. 7, 1957 3 Sheets-Sheet 2

INVENTOR.
HANS SCHWAB
BY

United States Patent Office 2,967,061
Patented Jan. 3, 1961

2,967,061

LOADING SYSTEM FOR TRAILERS AND LIKE VEHICLES ON PLATFORMS

Hans Schwab, Pfaffenhofen/Roth, near Neu-Ulm, Germany, assignor to Karl Kassbohrer Fahrzeugwerke G.m.b.H., Ulm (Danube), Germany Filed Oct. 7, 1957, Ser. No. 688,594

Claims priority, application Germany Oct. 10, 1956

5 Claims. (Cl. 280—43.15)

The present invention relates to improvements in trailer and like structures for motor driven cars or like automotive vehicles.

Due in some cases to the lack of good highways and in other cases for reasons of resulting economic advantages, trailers are frequently transported on flat railway cars, or the like. Although desirable, this cannot be done in many cases due to the height of the van of the trailer or due to the height of the load carried by an open-body trailer.

One of the primary objects of the present invention is to provide means ensuring, in a very simple manner, that the permissible height of a trailer or other vehicle loaded on a flat car will not be exceeded.

Another object of the present invention is to provide means whereby a portion of the overall height of the vehicle, due to its wheels, may be eliminated.

Another object of the present invention is to provide means conducive to a very economical trailer structure whose wheels may be readily removed or retracted before the trailer is lowered onto the flat car or like support.

Another object of the present invention is to provide means obviating the necessity of lashing or securing the trailer to the supporting surface of a car and like transporting means.

A further object of the present invention is to provide means affording a novel axle arrangement for the wheels of a trailer and a very efficacious arrangement for mounting the wheels on said axle.

Yet another object of the present invention resides in the provision of means facilitating a substantially undisplaceable, sturdy and safe attachment of a trailer as well as ready decoupling of the latter from the platform or like support surface with which the trailer is connected, while the wheels of the trailer may be swung into predetermined inoperative or semi-inoperative positions, respectively.

Still a further object of the invention is to provide means redounding to an easy transformation of existing trailer structures into an improved arrangement which fulfills the requirements and great advantages which are contemplated by the invention.

Other and further objects and advantages of the present invention will become apparent from a reading of the following description taken in connection with the drawings which illustrate the presently preferred embodiment of the invention.

Figure 1:
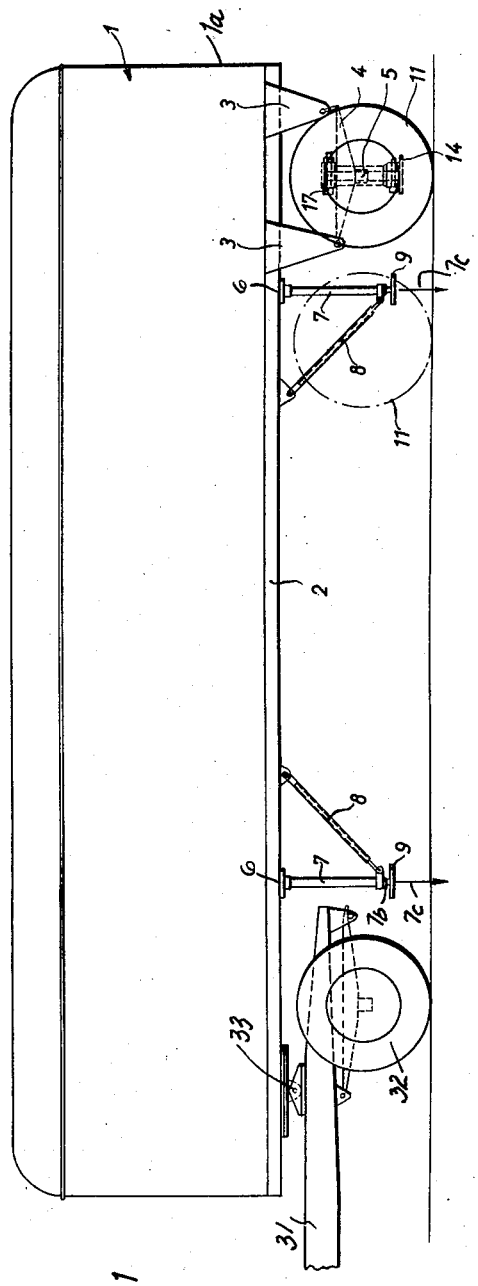
Fig. 1 is a side elevation of a semi-trailer truck unit embodying the present invention, seen in one position.

Referring now to the drawings in greater detail, there is shown a semi-trailer pursuant to the present invention. The semi-trailer 1 is adapted to be releasably coupled to a motor-driven truck or tractor (not illustrated) by means of the conventional coupling device 31. The semi-trailer comprises a van body 1a mounted on a chassis comprising a pair of parallel side frame members 2. At the rear thereof, each frame member 2 is provided with two sets of paired conventional depending spring brackets 3. The brackets mount a conventional leaf spring assembly 4 which is connected to a rigid axle 5, in a conventional fashion.

A first cross member 6 is secured to the bottom of the van 1a inwardly of the brackets 3 at the rear of the van and a second cross member 6 is similarly mounted inwardly of the truck-coupling device 31 at the front of the van. Each cross member mounts a pair of laterally related lifting or raising jacks 7. Each jack comprises an outer casing or cylinder 7a in which there is telescopically mounted a movable jack part 7b provided with a base support 9. Each jack casing is secured to the bottom of the van by rod 8.

The axle 5 comprises a central segment or non-rotary part 10 which is secured to the spring assemblies 4 and two axle stubs 12 whose axes are normally in alignment with the axis of axle 5. Each stub 12 supports a wheel assembly 11. A shoe 13 is mounted on each end of the central axle part 10. A sole plate or base support 14 is rigidly secured to one side of each axle shoe and a mounting bracket 15 is rigidly secured to the other side of each axle shoe. Each bracket 15 has an upper eye 16, in which there is retained a floating pivot 17, and a lower eye 18 in which there is defined an aperture or bore 19.

Each wheel assembly 11 is carried by a jaw-like wheel mount 20 which is suspended at the upper end thereof from the associated floating pivot 17. Each pivot 17 extends in a direction longitudinally of the vehicle. The lower end of each jaw mount is provided with an aperture or bore 21 registrable with and complementary to the aperture 19 in the associated bracket 15. Each axle stub 12 and associated wheel assembly 11 are held in the jaw mount 20 by means of a pin 22 (indicated in dotted lines in Fig. 2).

Figure 2:
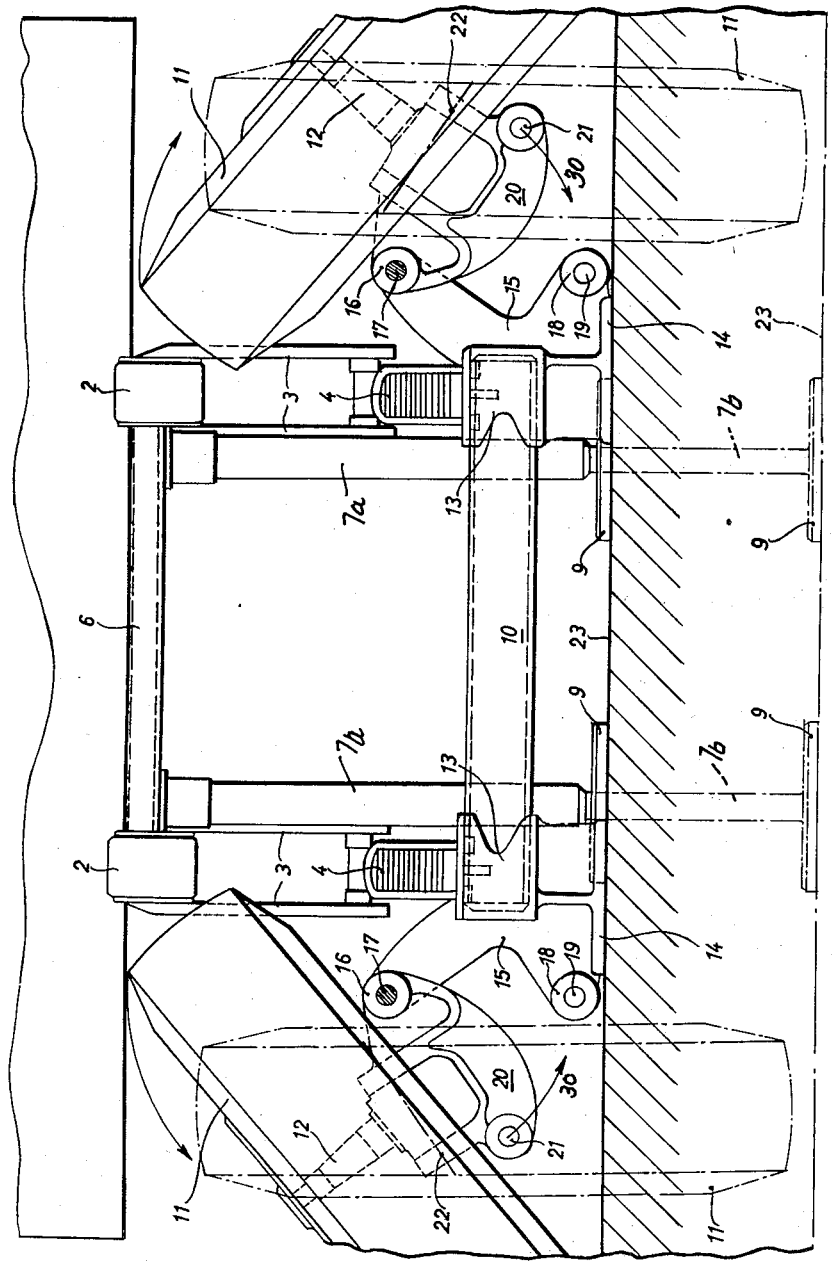
Fig. 2 is a fragmentary rear view of the trailer unit, on a larger scale and shown in a transformed position.

After the semi-trailer vehicle is driven on to the loading bridge or platform 23 of a railway flat car or like vehicle, the telescoped elements 7b of the jacks 7 are moved downwardly out of the associated jack housings 7a, as indicated by the arrows 7c in Fig. 1, until they reach the position thereof shown in dotted lines in Fig. 2, in which the base supports 9 are disposed on the upper surface of the loading bridge 23. This causes the wheels 11 to be raised above the surface of the bridge 23, as shown in the dotted line position of the wheels in Fig. 2. This dotted line position of the wheels represents their normal operative position relative to the axle segment 10.

Figure 3:
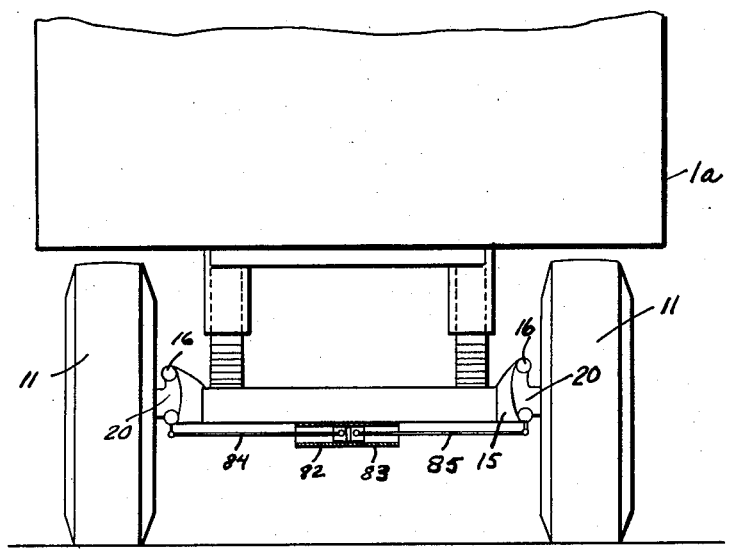
Fig. 3 is a rear end view of a modified embodiment of the invention.

In said normal operating position each mounting jaw aperture 21 is in registry with the associated bracket aperture 19 and a pin or stud (not shown) is engaged in the registered apertures. Upon the removal of said pin, each wheel assembly 11 can be pivoted about pivot pin 17 from the dotted to the full line position thereof shown in Fig. 2. This can be accomplished manually and the wheels can then be locked in a conventional fashion in their retracted inoperative full line position, as in Fig. 2. It is within the scope of the present invention to retract the wheels 1 otherwise than by manual means. For example, pressure cylinders 82 and 83 provided with slidable pistons 84 and 85 may be utilized to rotate the pivots 17 through the use of rods and levers (Fig. 3). After the wheels 11 have been swung to their inoperative positions, the jack elements 7b are retracted into the jack casings 7a, and the trailer or vehicle is lowered until the base supports 14, provided on the central segment 10 of the axle 5, are engaged on the upper surface of the loading bridge 23 of the railway freight car. The vehicle is now firmly positioned on the loading bridge and can be transported by the flat car without the necessity of being lashed thereto.

It is of course possible to completely remove the wheels 11 from the vehicle prior to lowering the latter onto the loading bridge 23. This can be accomplished by forming the pivots 17 as removable studs. However, this will not change the height of the vehicle above the loading bridge 23 when the supports 14 are mounted thereon. Moreover, it will be more difficult to remount the removed wheels than is the case where the wheels are merely swung back about the pivots 17 and need only be swung forward, as shown by arrows 30, to align the apertures 19 and 21 and insert a pin therein, when the trailer is jacked up again to return the wheels to their dotted line position in Fig. 2. In addition, the pivoted arrangement of the wheel mountings, without removal of the wheels, offers other advantages. For example, if the wheels are provided with brakes, care must be taken in separating the wheels from the brake rods. This can be accomplished quite simply if the brake rods are sub-divided into a center piece and end pieces, each connected to the center piece, for example by suitable couplings, and swinging with the brake or the associated wheel assembly 11.

If the wheels 11 have a king-pin steering assembly and are steered by a conventional servo-steering mechanism, the steering linkage may also be subdivided and coupled in the same manner. Driven wheels may also be swung or swiveled in the described manner. However, in this case, the driving shaft only must be subdivided, and the portions of the driving shaft may also be connected together by suitable coupling devices. The disconnection and reconnection of such rods or shafts may be accomplished automatically during the swinging of the wheels 11 on their pivots 17, without the necessity of loosening any locking mechanism.

Instead of the semi-trailer vehicle shown in the drawings, it is possible to construct any other vehicle, regardless of whether it is a trailer or a motor-driven vehicle, in the illustrated and described manner for retracting the wheels thereof so that the vehicle can be mounted directly on a flat or platform-equipped car or the like by means of axle supports 14.

If the vehicle or trailer has two rear axles 5, as in the described embodiment wherein the wheels 11 associated with one axle 5 are shown in full lines in Fig. 1 and the associated set of wheels 11 are shown in broken lines in said figure, all the wheels must be swingably mounted on their associated axles. It will be understood that the forward set of rear wheels 11 are also provided with an axle 5 which is mounted and constructed similar to the axle 5 for the rear set of the rear wheels.

Semi-trailer vehicles are simpler to deal with than other types of vehicles. This is due to the fact that semi-trailers are usually provided with the front jacks 7 since they do not have their own front wheels. In this connection, it will be noted that the front wheels 32 are mounted by the truck coupler device 31 which is releasably secured to the forward end of the semi-trailer, as at 33.

While there is shown and described the preferred embodiment of the invention, it will be understood that various changes may be made in the present invention without departing from the underlying principles of the invention within the scope of the appended claims.

Having thus described the invention, what is claimed as new and desired to be secured by Letters Patent, is:

1. A vehicle comprising a frame having wheels provided at least at the rear thereof, jack means provided at the front and rear of said frame for raising the wheels thereof above a supporting surface, means releasably securing said wheels to said frame, said securing means including a pivot for each wheel about which the wheel can be swung to a retracted position from a normal operative disposition relative to said frame, flat base means provided on said frame for supporting said vehicle with the wheels thereof retracted and with the vehicle lowered onto said surface by said jacks, said vehicle being provided with axle means for the wheels thereof and said base means being mounted on said axle means, said axle means comprising a central non-rotary part and an axle stub in articulated relation with each end of said axle part, each stub mounting an associated wheel, and spring means mounted by said chassis, said spring means supporting said axle part.

2. A vehicle comprising a frame having wheels provided at least at the rear thereof, jack means provided at the front and rear of said frame for raising the wheels thereof above a supporting surface, means releasably securing said wheels to said frame, said securing means including a pivot for each wheel about which the wheel can be swung to a retracted position from a normal operative disposition relative to said frame, flat base means provided on said frame for supporting said vehicle with the wheels thereof retracted and with the vehicle lowered onto said surface by said jacks, said vehicle being provided with axle means for the wheels thereof and said base means being mounted on said axle means, said axle means comprising a central non-rotary part and an axle stub in articulated relation with each end of said axle part, each stub mounting an associated wheel, each stub being carried by a jaw mount, and each jaw mount being connected to said central part by a floating pivot which extends in the longitudinal direction of the vehicle.

3. A vehicle comprising a frame having wheels provided at least at the rear thereof, jack means provided at the front and rear of said frame for raising the wheels thereof above a supporting surface, means releasably securing said wheels to said frame, said securing means including a pivot for each wheel about which the wheel can be swung to a retracted position from a normal operative disposition relative to said frame, flat base means provided on said frame for supporting said vehicle with the wheels thereof retracted and with the vehicle lowered onto said surface by said jacks, said vehicle being provided with axle means for the wheels thereof and said base means being mounted on said axle means, said axle means comprising a central non-rotary part and an axle stub in articulated relation with each end of said axle part, each stub mounting an associated wheel, each stub being carried by a jaw mount, and each jaw mount being connected to said central part by a floating pivot which extends in the longitudinal direction of the vehicle, each stub being removably mounted in its associated jaw mount.

4. A vehicle comprising a frame having wheels provided at least at the rear thereof, jack means provided at the front and rear of said frame for raising the wheels thereof above a supporting surface, means releasably securing said wheels to said frame, said securing means including a pivot for each wheel about which the wheel can be swung to a retracted position from a normal operative disposition relative to said frame, and flat base means provided on said frame for supporting said vehicle with the wheels thereof retracted and with the vehicle lowered onto said surface by said jacks, said vehicle being provided with axle means for the wheels thereof and said base means being mounted on said axle means, said axle means comprising a central non-rotary part and an axle stub in articulated relation with each end of said axle part, each stub mounting an associated wheel, said axle means and said axle stub having aligned axis, said pivot for each wheel being disposed above said axis so that each wheel in a retracted position has at least a major portion thereof above said axle.

5. A vehicle comprising a frame having wheels provided at least at the rear thereof, jack means provided at the front and rear of said frame for raising the wheels thereof above a supporting surface, means releasably securing said wheels to said frame, said securing means including a pivot for each wheel about which the wheel can be swung to a retracted position from a normal operative disposition relative to said frame, flat base means provided on said frame for supporting said vehicle with the wheels thereof retracted and with the vehicle lowered onto said surface by said jacks, said vehicle being provided with axle means for the wheels thereof and said base means being mounted on said axle means, said axle means comprising a central non-rotary part and an axle stub in articulated relation with each end of said axle part, each stub mounting an associated wheel, said axle means and said axle stub having aligned axis, said pivot for each wheel being disposed above said axis so that each wheel in a retracted position has at least a major portion thereof above said axis, each stub being connected to said central part by a floating pivot which extends in the longitudinal direction of the vehicle.

References Cited in the file of this patent

UNITED STATES PATENTS

| | | |
|---|---|---|
| 1,484,622 | Claus | Feb. 26, 1924 |
| 2,513,855 | Fogwell | July 4, 1950 |
| 2,696,772 | Underdown | Dec. 14, 1954 |
| 2,751,234 | Couse | June 19, 1956 |
| 2,867,444 | Henning | Jan. 6, 1959 |